(12) United States Patent
Zenoni et al.

(10) Patent No.: US 6,356,048 B1

(45) Date of Patent: Mar. 12, 2002

(54) METHOD AND DEVICE FOR CONTROLLING ELECTRIC MOTORS OF THE BRUSHLESS DIRECT-CURRENT TYPE, PARTICULARLY FOR MOVING THE WEFT WINDING ARM IN WEFT FEEDERS FOR WEAVING LOOMS

(75) Inventors: Pietro Zenoni; Giovanni Pedrini, both of Leffe; Luca Gotti, Abino Vecchio, all of (IT)

(73) Assignee: L.G.L. Electronics S.p.A., Gandino (IT)

( * ) Notice: Subject to any disclaimer, the term of this patent is extended or adjusted under 35 U.S.C. 154(b) by 0 days.

(21) Appl. No.: 09/565,747

(22) Filed: May 8, 2000

(30) Foreign Application Priority Data

May 14, 1999 (IT) .......................................... TO99A0399

(51) Int. Cl.[7] ................................................. H02P 5/28
(52) U.S. Cl. ..................... 318/806; 318/811; 318/798; 318/801; 318/139; 318/254; 318/434; 388/907.2
(58) Field of Search ................................. 318/806, 811, 318/798, 801, 139, 254; 388/907.2

(56) References Cited

U.S. PATENT DOCUMENTS

| 5,825,597 A | * 10/1998 | Young | ........................ 318/806 |
| 6,060,859 A | * 5/2000 | Jonokuchi | .................... 318/801 |
| 6,104,113 A | * 8/2000 | Beifus | ........................ 318/254 |

* cited by examiner

Primary Examiner—Karen Masih
(74) Attorney, Agent, or Firm—Guido Modiano; Albert Josif; Daniel O'Byrne

(57) ABSTRACT

The method consists in determining the angular positions of the rotor, which are useful for switching the phase currents, by deducing them from the sampled reading of the phase voltages, and in measuring the current of each phase by deriving it from the detection of the voltage that is present across a shunt resistor inserted on the negative power supply conductor of the three-phase star bridge of the driving inverter that generates the set of three phase voltages supplied to the motor.

8 Claims, 4 Drawing Sheets

METHOD AND DEVICE FOR CONTROLLING ELECTRIC MOTORS OF THE BRUSHLESS DIRECT-CURRENT TYPE, PARTICULARLY FOR MOVING THE WEFT WINDING ARM IN WEFT FEEDERS FOR WEAVING LOOMS

BACKGROUND OF THE INVENTION

The present invention relates to a method and a device for controlling brushless direct-current electric motors, commonly known by the acronym BLDC, which allow the advantageous application of said motors to the movement of the weft winding arm in weft feeders for weaving looms.

It is known that weft feeders are devices which comprise a fixed drum on which a weft winding arm winds, as in a fishing reel, a plurality of turns of thread which constitutes a weft reserve. Said turns unwind from the drum of the feeder, when requested by the loom, at each weft insertion, and the weft winding arm, under the control of a supervisor microprocessor, winds new turns in order to restore the weft reserve.

The motor that is currently most widely used for moving the weft winding arm is the three-phase asynchronous type. This choice is essentially dictated by the inherent characteristics of these motors and mainly by their low installation and maintenance costs, afforded by their simple and sturdy structure and by their complete lack of elements in mutual sliding contact.

Moreover, the evolution of semiconductor technology has made available control microprocessors which integrate peripherals capable of directly generating the waveforms of the control signals for the inverter that actuates said motors, where the term "inverter" designates the driving device capable of generating a system of multiple-phase sinusoidal voltages whose amplitude and frequency can be varied at will.

However, although said three-phase asynchronous motors yield satisfactory efficiency in terms of performance/cost ratio, they have some drawbacks which limit said performance, especially when applied to the movement of said weft winding arm of weft feeders.

The greatest of these drawbacks is that it is impossible to achieve effective and simple control of the torque delivered by the motor. For this purpose it is in fact necessary to resort to sophisticated control systems of the vector type, which however, due to the large number of sensors required (at least two for phase current control and one for detecting the rotation rate) and to the high computing power requirement, are not adapted for low-cost installation on said weft feeders. Accordingly, such expensive and complicated control systems of the vector type are avoided, by typically assuming, for motor speed adjustment, an open-loop system, leaving the synchronization speed set by the inverter to be chased by said motor.

In this manner, however, it is not possible to obtain high-level dynamic performance from the motor, and this is a severe drawback if the weft winding arm of said feeder is required to provide high accelerations and decelerations, as increasingly often occurs due to the continuous increase in weaving speed.

Moreover, with the open-loop adjustment system the current absorbed by the motor is often significantly higher than actually required, and therefore the excess absorbed power is dissipated as heat, causing dangerous overheating of the motor and of the electronic components of the power section of the inverter.

SUMMARY OF THE INVENTION

The aim of the present invention is to eliminate these severe drawbacks by replacing, for the movement of the weft winding arm in said weft feeders, the three-phase asynchronous motor with a motor of the above specified brushless direct-current type and by providing a method and a device for controlling said brushless motor which are particularly adapted to meet the operating requirements of modern weft feeders.

The advantages provided by the use of a brushless motor instead of the three-phase asynchronous motor substantially consist in the possibility to directly and easily control the torque by way of the corresponding control of the current that circulates in the switched stator phases; in the improved power/volume ratio, with a consequent and corresponding reduction, for an equal delivered power, in the dimensions of the motor and, as a whole, of the feeder; in the reduced inertia of the rotor, allowing better accelerations; and in the simplification of the stator windings by means of the adoption of diametrical turns.

However, conventional devices currently used for driving a brushless motor typically have a supervisor microprocessor, an angular velocity sensor and a set of three position sensors designed to encode the angular position of the rotor in steps of 60 electrical degrees. This information is in fact essential in order to allow the supervisor microprocessor to switch the correct stator phases, i.e., the phase currents that generate a stator flux in quadrature with the rotor flux generated by the permanent magnets.

The presence of said angular velocity and position sensors, however, significantly complicates the structure of the driving device and offsets most of the above-listed advantages which are typical of brushless motors, on the one hand by significantly increasing the installation costs of said motors and their overall dimensions and on the other hand by equally significantly reducing the reliability of the motor/control system.

The aim of the present invention is to provide a method and a device for controlling brushless motors which, by eliminating the drawbacks of conventional control systems, make it advantageous to apply said motors to the movement of the weft winding arm, maintaining its inherent characteristics, which are particularly favorable for this application, with all the consequent advantages.

Within the scope of this aim, an object of the present invention is to provide an adjustment method and device which are simple, inexpensive and highly efficient and reliable.

According to the present invention, these and other objects which will become better apparent hereinafter are achieved with a method and a device for controlling electric motors of the brushless type which have the specific characteristics stated in the appended claims.

Substantially, the invention is based on the concept of eliminating, in the control system, the angular velocity sensor and the set of three sensors that encode the angular position of the rotor, and of determining said velocity and position by deducing them from the sampled reading of the phase voltages of the motor, providing the supervisor microprocessor with corresponding information useful for stator phase switching. Moreover, according to the invention, the current of each phase is measured by means of a shunt resistor which is inserted on the negative conductor of the three-phase power supply bridge, since only one current at a time circulates in brushless motors.

BRIEF DESCRIPTION OF THE DRAWINGS

Further characteristics and advantages of the control method and device according to the invention will become better apparent from the detailed description that follows and with reference to the accompanying drawings, provided by way of non-limitative example, wherein.

DESCRIPTION OF THE PREFERRED EMBODIMENTS

Figure 1A:
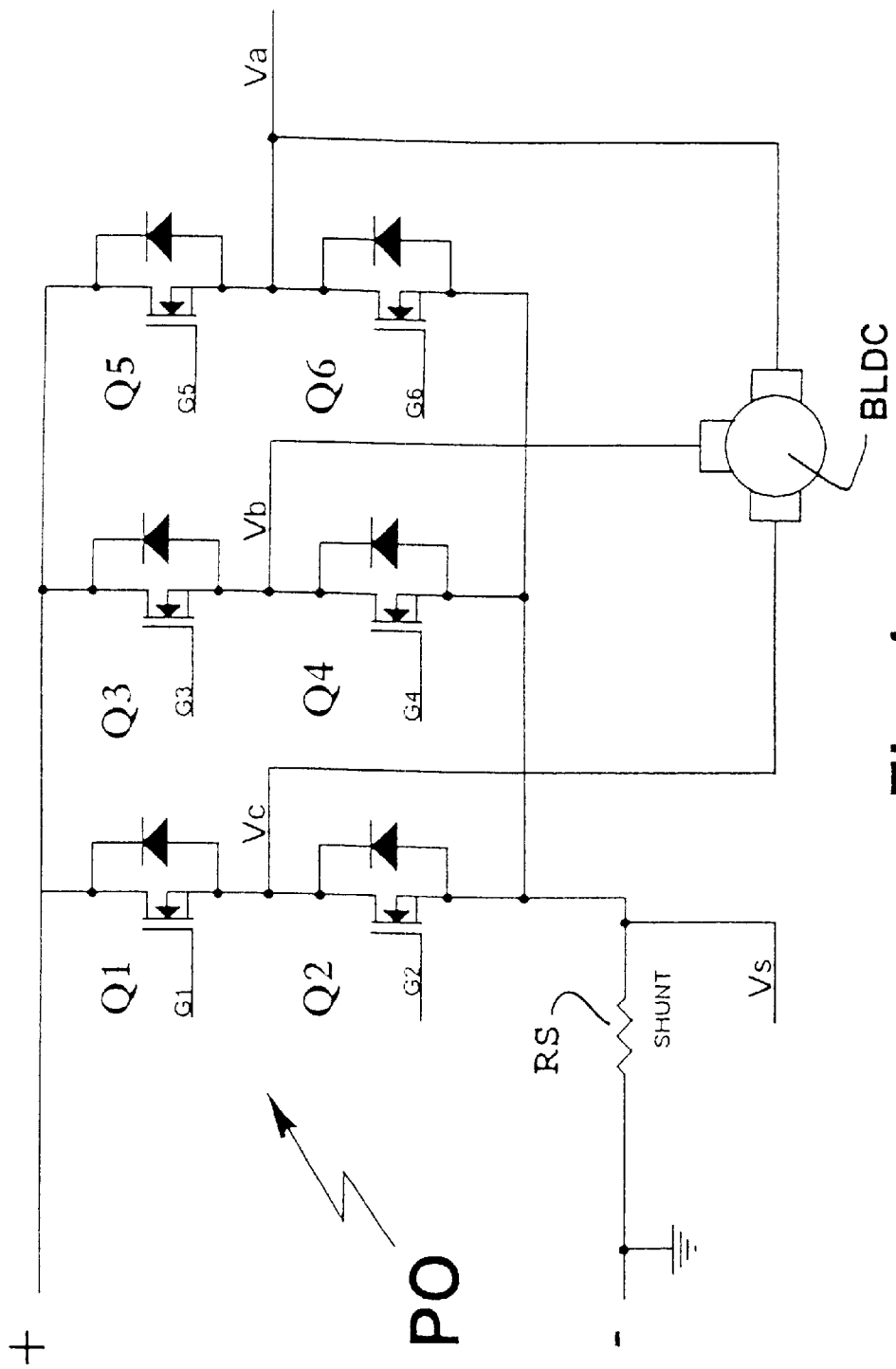
FIGS. 1a, 1b, 1c form, as a whole, the electrical diagram of the control device according to the invention.

In FIG. 1, PO generally designates the star bridge of a driving inverter of a per se known type, which generates a set of three phase voltages Va–Vb–Vc, which in the illustrated example are applied to a brushless motor BLDC.

In a per se known manner, the bridge PO is constituted by six power transistors Q1 . . . Q6 of the MOSFET or IGBT type, each provided with a control electrode (gate) to which a respective switching signal G1 . . . G6 is applied, and each having an integrated recirculation diode arranged in parallel to the transistor. The DC voltage V is fed to said bridge and is applied between a positive conductor Cp and a negative conductor Cn connected to the ground.

Figure 1B:
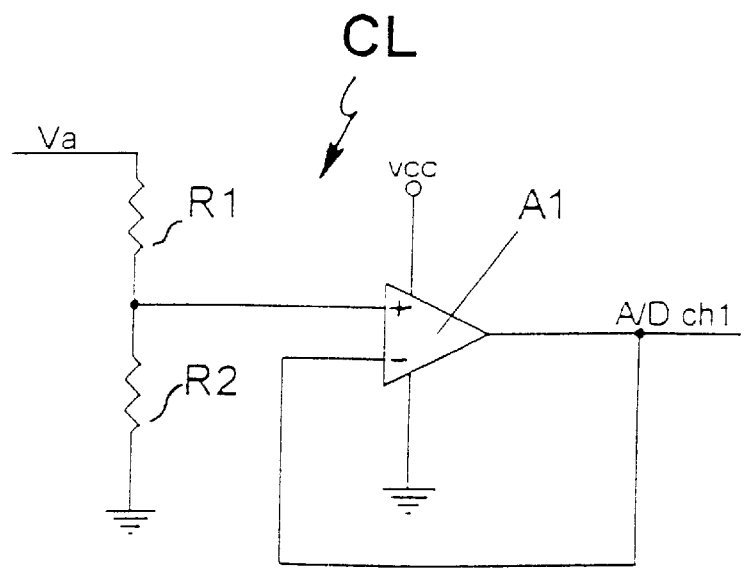
Figure 1C:
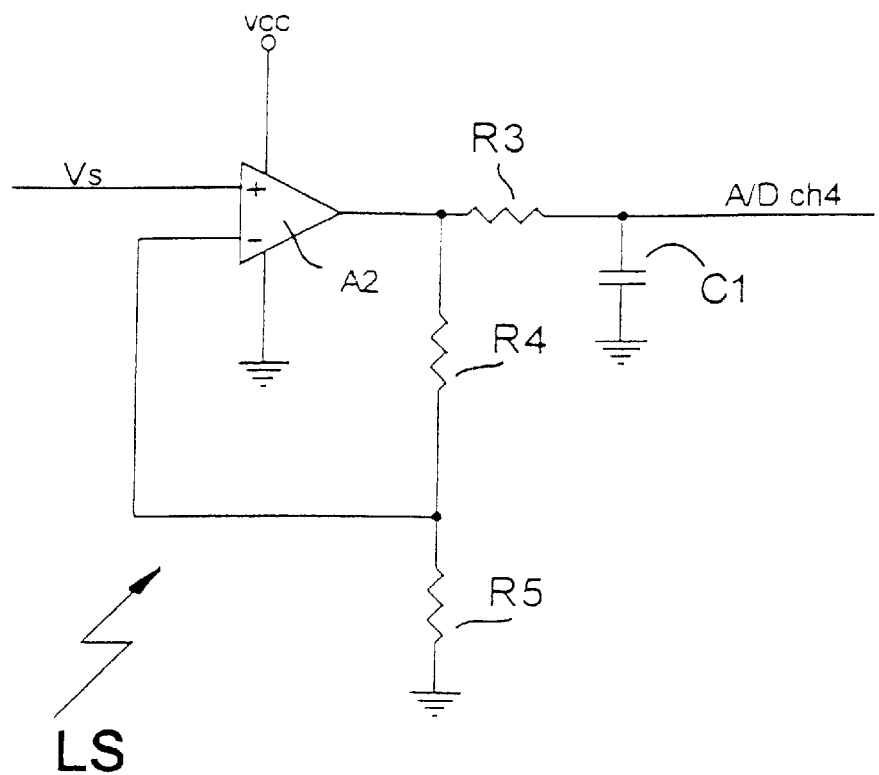
Figure 2:
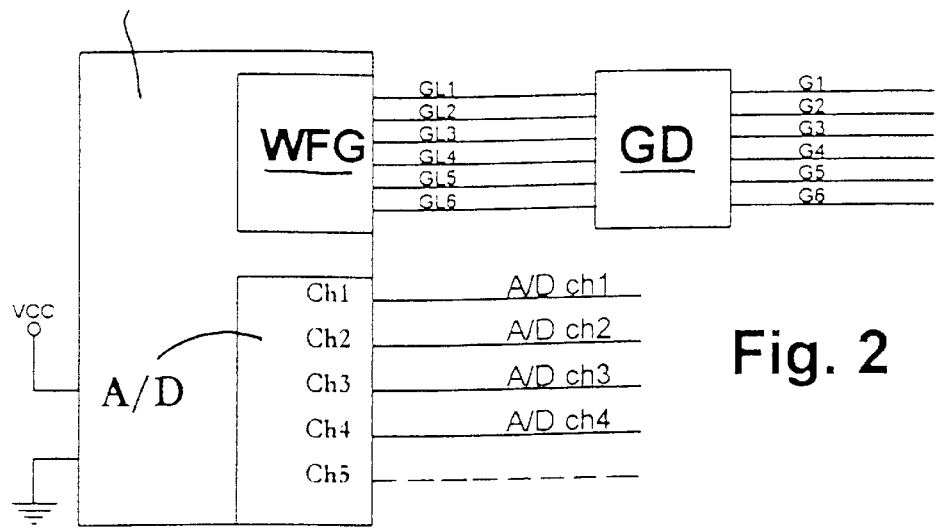
FIG. 2 is a diagram of the control microprocessor that drives the device of FIGS. 1a–c with the corresponding peripherals integrated therein.

According to the present invention, each one of the phase voltages Va–Vb–Vc is detected by a corresponding detection circuit CL, shown in FIG. 1b, and is sent by said circuit to the corresponding channel Ch of an analog-digital converter A/D, which constitutes an integrated peripheral of a supervisor microprocessor MC, in order to provide said microprocessor with a signal which is useful for switching the stator phases, as explained in detail hereinafter.

Each circuit CL comprises a divider R1–R2 which attenuates the respective phase voltage (Va in the illustrated example) to a value which is compatible with the input of the converter A/D, followed by an amplifier A1 designed to decouple said resistors R1–R2 from the signal sent directly on said corresponding channel of the converter A/D.

According to another characteristic of the invention, the current switched in the various phases is detected, in order to provide a corresponding useful signal to the microprocessor MC, by converting into a voltage Vs, by means of a shunt resistor RS, the current that circulates on the negative conductor Cn for supplying the bridge PO. In order to limit the dissipation on the shunt resistor RS, the voltage Vs is necessarily chosen low, so that it is conveniently processed in a corresponding detection circuit LS, shown in FIG. 1c, which is formed by a network which comprises an amplifier A2 which is fedback by the voltage of a resistive divider R4–R5; said network introduces an amplification factor equal to 1+R4/R5. The output of the amplifier A2 is filtered in the low-pass filter R3-C1, which eliminates the high-frequency noise that is present in the signal Vs (generated by the fast switching of the power transistors Q) and the filtered signal is sent to a corresponding channel Ch of the converter A/D, which is also an integrated peripheral of the microprocessor MC. Accordingly, the peripheral A/D has at least three channels Ch1-2-3 dedicated to reading the phase voltages and an additional channel Ch4 dedicated to reading the phase current expressed in terms of corresponding voltage Vs.

An additional peripheral WFG (Wave Form Generator), further integrated in the microprocessor MC, generates logic signals GL1–GL6, and a subsequent circuit block GD (Gate Driver) converts said signals into the real signals for controlling the electrodes G1–G6 of the power transistors Q1–Q6.

Figure 3:
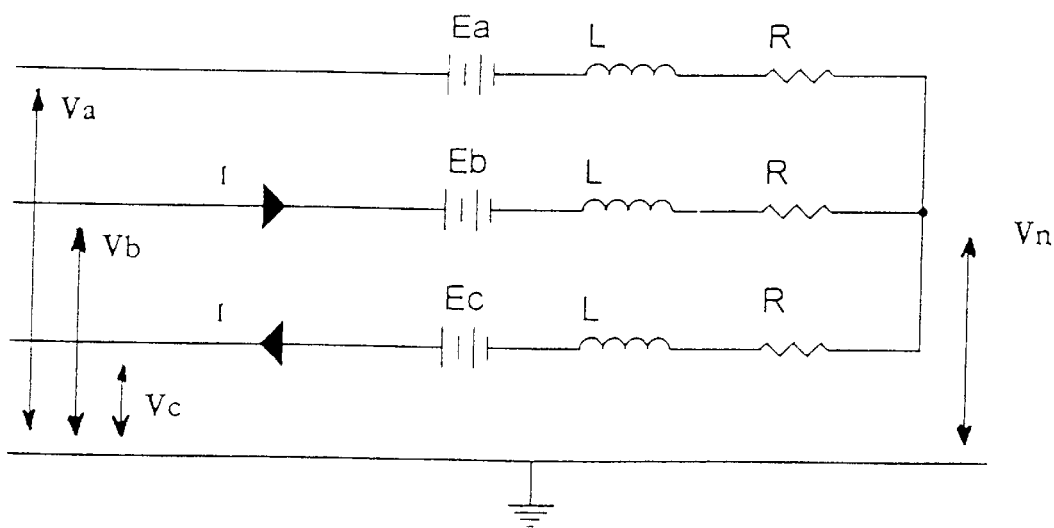
FIG. 3 is an electrical diagram of the stator windings of the motor controlled by the control device of FIGS. 1.

The sensorless switching method according to the present invention is now described with reference to FIGS. 3 and 4.

Figure 4:
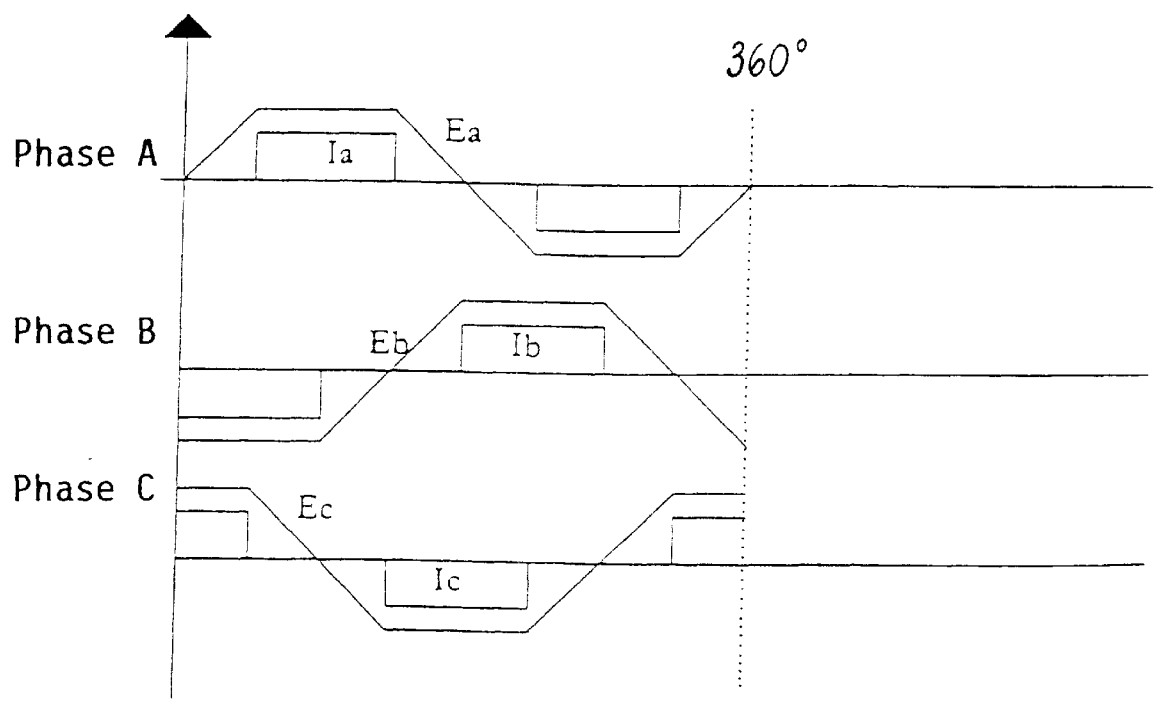
FIG. 4 is a chart which plots the counterelectromotive forces generated in the stator windings of FIG. 3.

It is known that in a BLDC motor the counterelectromotive forces Ea–Eb–Ec induced in the corresponding windings by the phase currents (FIG. 3) have, as the electric angle ae varies, the trapezoidal behavior shown in the chart of FIG. 4. Said chart also plots the currents Ia-Ib-Ic that circulate in the respective phases A-B-C. The chart shows that the generic counterelectromotive force Ex crosses zero 30 electrical degrees before and after the switching of the corresponding current Ix that circulates in the winding being considered.

The method according to the invention consists in taking the zero crossing of the counterelectromotive force Ex as the time reference for determining the switching time of the corresponding current Ix. Moreover, the microprocessor deduces the zero crossing of the generic counterelectromotive force Ex from the value of the respective phase voltage Vx at the same instant.

With reference to the notations of FIG. 4, where I designates the current, R and L designate the resistance and the inductance of each phase, and Vn designates the center-star voltage of the bridge PO relative to the ground, the following equations in fact hold:

$$Va = Ea + Vn \qquad 1)$$

$$Vb = Eb + RI + L\, dI/dt + Vn \qquad 2)$$

$$Vc = Ec - RI - L\, dI/dt - Vn \qquad 3)$$

At the instant in which Ea=0, one has:

$$Va = Vn \text{ and } Eb = -Ec \qquad 4)$$

$$Vb + Vc = 2Vn = 2Va \qquad 5)$$

$$Va = \frac{Vb + Vc}{2}$$

and more generally $$6)\ Vx = \frac{Vy + Vz}{2}$$

This means that the counterelectromotive force of the unpowered phase, which is the phase A in the example, crosses zero when the voltage Va of that phase is equal to the arithmetic mean of the other two phase voltages.

Accordingly, according to the invention, the microprocessor MC is programmed to sample, at a sufficiently high rate, the phase voltages Va–Vb–Vc, and by detecting, for each phase, the corresponding value of the voltage for which the respective counterelectromotive force becomes zero, it calculates, starting from the instant when said value is detected, the time Tc at the end of which the bridge PO of the driving inverter must switch to the subsequent state.

Correspondingly, since the zero crossings of the three counterelectromotive phases are equally spaced at 60°-electrical and at 60°p-mechanical (where p is the number of poles of the BLDC motor), the microprocessor MC, by measuring the time interval between two (or more) consecutive zero crossings, also deduces the angular velocity at the rotor.

Without altering the concept of the invention, the details of execution of the control method and the embodiments of the device for performing the method can be varied extensively, with respect to what has been described and illustrated by way of non-limitative example, without thereby abandoning the scope of the invention.

The disclosures in Italian Patent Application No. TO99A000399 from which this application claims priority are incorporated herein by reference.

What is claimed is:

1. A method for controlling brushless direct-current (BLDC) electric motors, for moving a weft winding arm in weft feeders for weaving looms, comprising the steps of: sample reading phase voltages of the rotor, determining angular positions of the rotor, by deducing said positions from the sampled reading of phase voltages; detecting a voltage established across a shunt resistor inserted on a negative power supply conductor of a three-phase star bridge of a driving inverter, deriving, from said voltage established across the shunt resistor a current of each phase, and generating a set of three phase voltages to be supplied to said motor.

2. The method of claim 1, wherein a state switching of said three-phase star bridge is activated at the end of a time which is calculates starting from an instant in which a counterelectromotive force of an unpowered phase becomes zero, said instant coinciding with the instant in which a voltage of said unpowered phase corresponds to an arithmetic mean of voltages of the other two phases.

3. A device for controlling brushless direct-current (BLDC) electric motors, for moving a weft winding arm in weft feeders for weaving looms, comprising: a driving inverter with a driving star bridge which generates a set of three phase voltages for application to a brushless motor; six power transistors, provided at said bridge, to which a DC voltage applied between a positive conductor and a negative ground conductor is supplied; respective electrodes, provided at said power transistors, and to which corresponding switching signals are applied; and a control microprocessor with an integrated peripheral for producing said switching signals.

4. The device of claim 3, further comprising: respective detection circuits for detecting said phase voltages; and an analog/digital converter which constitutes another integrated peripheral of said control microprocessor, an output of each said detection circuit being connected to a corresponding channel of said analog/digital converter.

5. The device of claim 4, wherein said negative power supply conductor of said star bridge comprises a shunt resistor which generates a voltage which corresponds to the phase currents that circulate in the bridge, a voltage measured with said shunt resistor being processed by a corresponding one of said detection circuits and sent directly to a corresponding channel of said analog/digital converter of said microprocessor.

6. The device of claim 4, wherein said detection circuits for detecting the phase voltages, include each, a resistive attenuating divider, and an amplifier which decouples respective resistors of said divider from a signal sent to the corresponding channel of said analog/digital converter.

7. The device of claim 5, comprising a circuit for reading said voltage generated by said shunt resistor, which comprises an amplification network with an amplifier; a resistive divider to feedback said amplifier; and a low-pass filter which is adapted to filter out switching noise that arrives from said driving bridge star.

8. The device of claim 7, wherein said microprocessor is programmed so as to sample, at a high rate, said phase voltages produced by said driving star bridge, and so as to produce a state switching of said star bridge at the end of a time which is computed starting from an instant in which said microprocessor verifies that a value of a voltage of an unpowered phase is equal to the arithmetic mean of the other phases.

\* \* \* \* \*